SYSTEM FOR LOADING AND DISCHARGING LIQUEFIED GASES FROM STORAGE TANKS

Filed April 28, 1966

INVENTORS
Donald R. Yearwood,
Norman K. Basile,
Thomas F. Bridges
BY Stevens, Davis, Miller & Mosher
ATTORNEYS

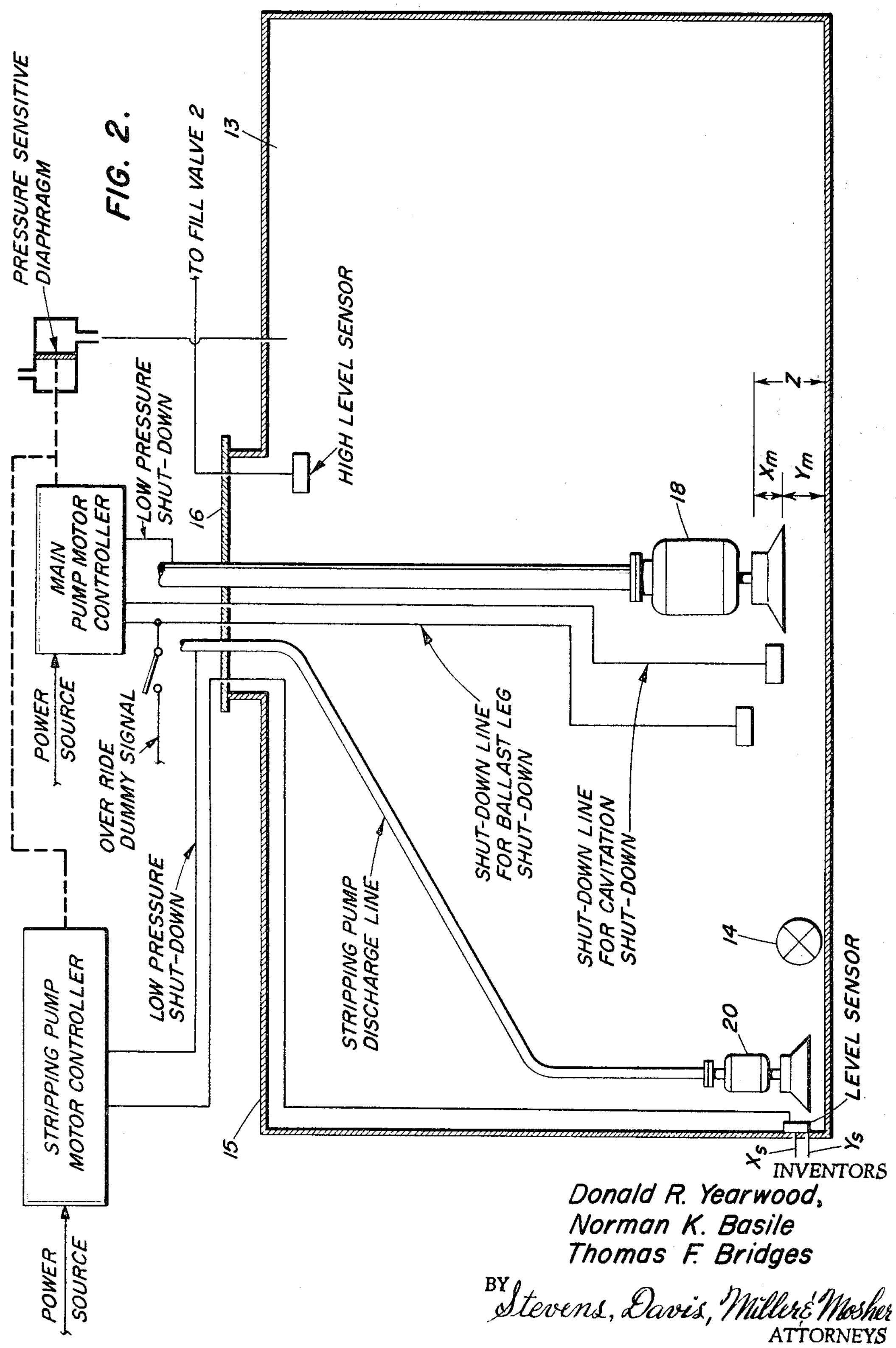
INVENTORS
Donald R. Yearwood,
Norman K. Basile
Thomas F. Bridges
BY Stevens, Davis, Miller & Mosher
ATTORNEYS United States Patent Office 3,434,492

Patented Mar. 25, 1969

3,434,492

SYSTEM FOR LOADING AND DISCHARGING LIQUEFIED GASES FROM STORAGE TANKS

Donald R. Yearwood, Brooklyn, Norman K. Basile, Bronx, and Thomas F. Bridges, Port Washington, N.Y., assignors to John J. McMullen, Montclair, N.J.

Filed Apr. 28, 1966, Ser. No. 546,103
Int. Cl. B65d 5/40; F17c 7/00, 9/00
U.S. Cl. 137—394 9 Claims

ABSTRACT OF THE DISCLOSURE

A system for delivering liquefied cargo gas into and discharging liquefied cargo gas from a plurality of storage tanks, particularly on a ship. The system includes a cargo main which connects with each tank by means of a tank header and loading valves. A main cargo pump is located near the bottom center of each tank, and a stripping pump is positioned at the rear of each tank. Motor controllers are associated with each pump, and the pump outputs are connected to the tank header.

The present invention relates to a system for loading and discharging liquefied gas cargo at approximately ambient pressure from storage tanks, particularly on ships.

It is conventional to divide liquefied gas storage tanks on board ship with a solid longitudinal bulkhead in order to reduce the required G.M. (metacentric height). Each compartment formed by the cargo tanks and longitudinal bulkhead is provided with a main cargo pump which discharges the liquid cargo from the tank. However, because of the required net positive suction head of the main pump, a substantial amount of cargo is left within the tank at the time the pump loses suction.

In addition, for carriage of cryogenic cargo of this type such as propane, methane and the like, it is desirous to maintain a level of cargo within the tanks after unloading, for the return or ballast leg of the voyage for the purposes of providing fuel for propulsion and to maintain the tanks in a cold state.

Furthermore, in the event ice or another solid substance enters the tank, the solidified particles could possible jam the main cargo pump impeller, and thus render the pump useless. The present invention solves the foregoing problems and it is the primary object of the present invention to provide within each compartment a small capacity stripping pump which maintains suction to a very low liquid level. The main pump is located physically near the tank header; however, the stripping pump is positioned at the rear of the tank. A sluice valve is provided in the longitudinal bulkhead to enable uniform filling and discharging of the tank compartments and to enable the main pump in one compartment to function as a backup system for the other compartment.

Another object of the present invention is to provide an automatic shutdown of the main cargo pumps during the discharging operation when predetermined levels of liquid remain in the tank and to automatically shut the tank loading valves at a predetermined high level.

Still a further object of the present invention is to back flush the main pump with warm gas to melt any substance restraining the rotating parts of the pump. and to permit the rapid vaporization of any liquid remaining in the tank after all pumps have been secured or failed.

These and other objects of the present invention will become apparent with the following detailed description when taken in view of the appended drawings in which:

FIGURE 2 is a diagrammatic illustration of the pump arrangement within the tank.

Figure 1:
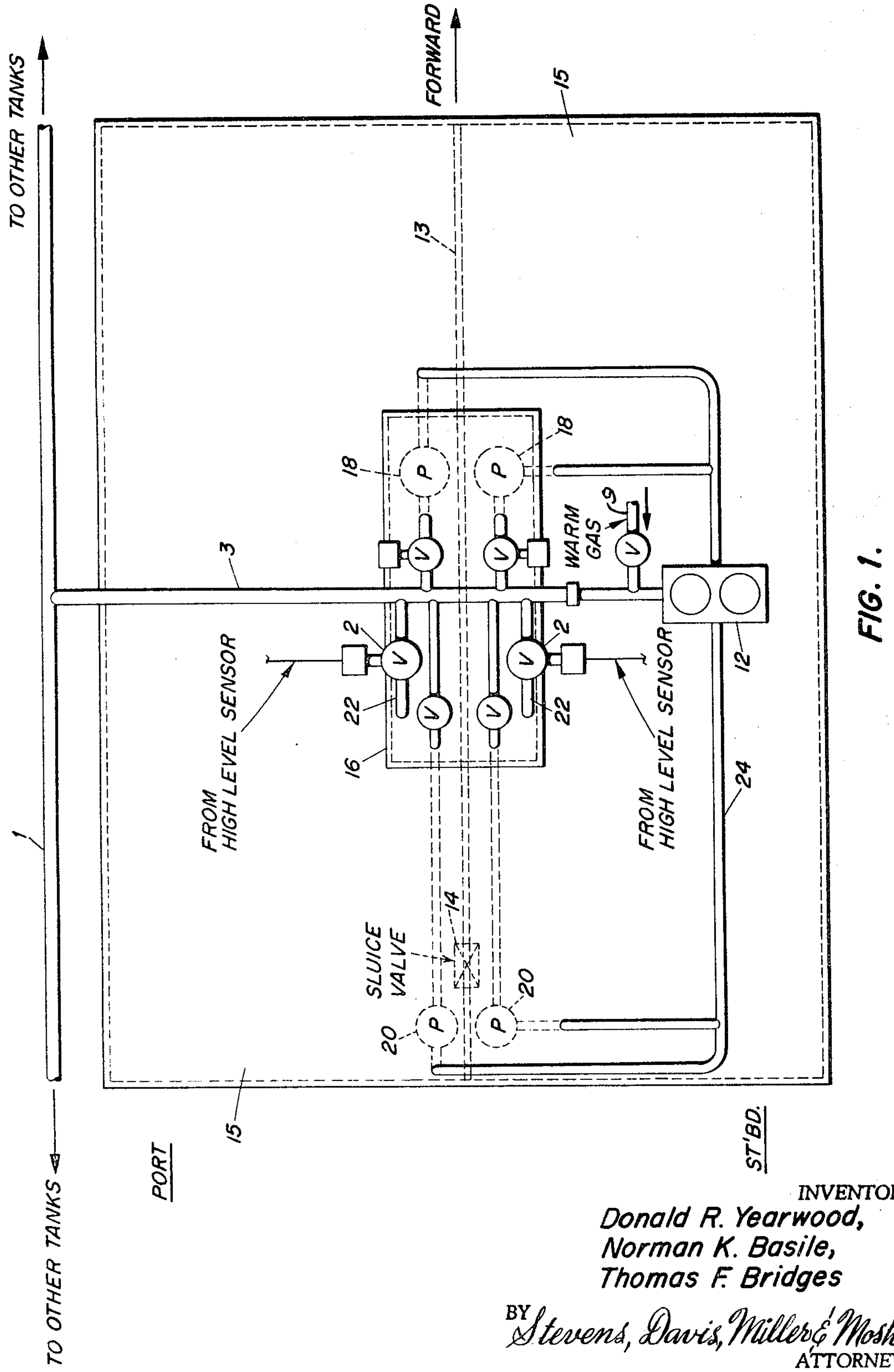
FIGURE 1 is a diagrammatic illustration of the system according to the present invention.

Tank 15 is divided into two compartments by tight longitudinal bulkhead 13. A sluice valve 14 in bulkhead 13 affords communication between compartments described below. Each tank 15 preferably includes a top center trunk 16 to accommodate various piping.

The cargo fill and discharge system includes a shore connected main 1 feeding a header 3 for each tank 15. Each tank compartment is equipped with a main cargo pump with a capacity of about 5300 gallons per minute, a stripping pump 20 with a capacity of about 200 gallons per minute, and a fill line 22. Each of these elements are coupled to header 3 through a valved line so that it can be selectively in or out of the system. Bleed lines 24 are provided to circulate cargo liquid as a lubricant to the main pump and stripping pump bearings. Strainer 12 in line 24 traps any solidified substance circulating therethrough. In the event solidified substance reaches the pumps, warm gas is supplied through valved line 9 to melt the substance and free the rotating parts of the pumps.

The main cargo pump 18 is located immediately below the hatch 16, which is located in the center of the tank to minimize expansion problems, for the following reasons:

(1) The pump is heavy and is more easily supported at this position.
(2) Piping runs are kept to a minimum and the main run is vertical minimizing problems due to expansion and contraction.
(3) The pump may be withdrawn vertically.

It can be appreciated that the above factors become increasingly important as the length of the tank is increased. According to the invention, stripping pump 20 is located at the rear of the tank for reasons set forth below.

*Cargo loading*

In the loading process liquid cargo is supplied to the cargo loading and discharging main 1 from shore via a shore connection, not shown. The tank fill valve(s) 2 are opened, and the liquid supplied from shore will flow through tank header 3 and fill line 22 to the tank(s) 15. The sluice valve 14 may be opened to insure equal filling of both port and starboard sections of the tank or may be left closed to keep the loss of G.M. due to free surface to a minimum thus enhancing the stability of the vessel.

The fill valve(s) 2 are fitted with an automatic shutdown device which will secure the valve when the liquid level in the tank reaches a predetermined point. This feature will prevent the tank's being subjected to the pressure of the liquid in the loading main when the tank is full.

A vent line, not shown, is provided to permit gas or vapor to leave the tank during the loading operation.

*Cargo discharging*

A characteristic of centrifugal pumps is that some minimum full capacity positive suction head X which is fixed by the pump design, is required to obtain the pumping action. When carrying liquid methane, ammonia, ethylene, or other low temperature or cryogenic temperature cargo in a ship it may be required to carry some of the cargo in the ballast voyage to keep the tanks cool or to use the boil-off for fuel. The quantity of cargo required for these purposes may be described by some level Z; FIG. 2. In the subject system the dimension $Y_m$ will be determined by the lowest position of the pump bell-mouth to obtain proper pump suction at full pump rating and $X_m$ the minimum full capacity positive head above the pump suction. Operation of the main cargo pumps, at full capacity, during the pump-out operation to lowest tank level $X_m+Y_m$ is therefore permissible. Any suitable commercially available level sensing device and pump discharge pressure switch are arranged in parallel to secure the main cargo pump when the level reaches $X_m+Y_m$ the minimum net positive suction head or cavitation occurs. These devices will interrupt power to the pump through auxiliary contactors in the pump motor controllers 30. A second device is provided to stop the pumps when the level is Z. This device will be provided with an override feature to be used as follows.

While it may be desirable to maintain a level of cargo Z in the tanks during the ballast voyage, it is sometimes desirable to pump out all cargo from the tanks. For example, the tanks will have to be emptied of all cargo prior to inspection or maintenance and repair work. In order to completely empty the tank, the level sensing device, provided to secure the pump when level Z is reached, is by-passed. The main cargo pump is placed in operation and will operate until some level $X_m+Y_m$ is reached. At this point the pump will cavitate and lose suction and be secured by means previously described.

An automatic shut-down device is also provided to secure the pumps in the event the tank pressure tends to drop below atmospheric pressure. An example of this device, which operates to interrupt power to the motor, could be a pressure sensing diaphragm switch set to interrupt power at about 0.7 p.s.i.g.

The smaller stripping pump 20 located in the after end of each tank has its minimum positive suction head $X_S$ and its minimum $Y_S$ dimension, which is determined by the area required to insure flow to the pump, much smaller than for the main cargo pump. Thus, this pump removes from the tank cargo that cannot be removed by the main cargo pump. Since the stripping pump is located in the after end of the tank, and the vessel will normally be trimmed by the stern, the stripping pump can be expected to remove all but a small quantity of the cargo. A level sensing device is provided to secure the stripping pump when the level corresponding to the cavitation point of the pump is reached.

Any small quantity of liquid that may remain in the tank after the stripping pump has been used may be removed by supplying warm gas from any available source, not shown. This gas will then supply heat to the liquid remaining in the tank and the liquid will boil-off via a vent line, not shown.

While the pumps shown in FIGURES 1 and 2 are of the submerged type it is to be understood that this system is applicable to deep-well type pumps, as well.

The warm gas line 9 may also be used to supply gas to the pump at other times, for example, in the cryogenic application, water or another substance may enter the tank and solidify in the pump impeller. With the present system warm gas is used to back flush the pump and melt any substance restraining the rotating parts of the pump.

To lubricate the pump bearings, liquid is supplied through strainer 12 from the discharge side of the pumps. The liquid is filtered and supplied to the pumps' bearings. This insures that the liquid, when being used as a lubricant for the pump bearings, is free from all foreign matter that may damage the bearings.

The sluice valve 14 also permits one port or starboard pump to pump out both port and starboard sections of the tank when opened. It can be seen that this feature would be of particular value should one main cargo pump fail.

The stripping pumps also serve as back-up pumps to the main cargo pumps. Should any main cargo pump fail the stripping pump can be used to empty the tank, albeit in a longer period of time.

Thus there has been disclosed a reliable and safe system for filling and discharging tanks with automatic shutdown override, and standby capabilities. It should be understood that various modifications can be made to the herein disclosed example without departing from the spirit and scope of the present invention.

What is claimed is:

1. A system for delivering liquefied cargo gas to and discharging from a plurality of storage tanks, particularly on ships, comprising a cargo main, a tank header connected from said main to the top center part of each of said tanks, a main cargo pump located near the bottom center of each said tank and having an outlet line extending upward to and communicating with the said tank header associated with the respective said tank, a stripping pump of smaller capacity than the main pump being positioned at the rear of each said tank and being operable at a lower liquid level than said main pump, said stripping pump having an output line extending upward and toward the center of the tank and being coupled to the said tank header associated with the respective said tank.

2. A system as set forth in claim 1 further comprising means to sense the liquid level in each said tank and secure the respective main pump when the liquid is reduced to a predetermined level as required for the ballast leg of the voyage.

3. A system as set forth in claim 2 wherein said last mentioned means is provided with an override capability.

4. A system as set forth in claim 1 further comprising means to sense the liquid level in each said tank and secure the respective main pump and respective stripping pump levels corresponding to minimum net positive suction heads respectively.

5. A system as set forth in claim 1 further comprising means to secure each of said main cargo pumps and stripping pumps at the onset of pump cavitation by sensing a drop in pumps discharge pressure, respectively.

6. A system as set forth in claim 1 further comprising tank liquid loading valves associated with each said tank, and means for shutdown of the tank liquid loading valves by a high liquid level transmitter, amplifier and valve actuator.

7. A system as set forth in claim 1 further comprising motor controller means including pressure switch means and auxiliary contactors for each said pump, and means for shutdown of each said main and stripping cargo pump at tank low gas pressure for example 0.7 p.s.i.g., by actuation of the pressure switch and auxiliary contactors in the motor controller means.

8. A system as set forth in claim 1 further comprising means for protecting main and stripping pump and motor bearings by filtered supply through a single duplex strainer fed from the common tank loading and discharge header.

9. A system as set forth in claim 1 wherein means are provided for removing the last of a vaporizable or gasifying liquid from a container by introducing a warm inert gas through pump discharge lines and bellmouths.

References Cited

UNITED STATES PATENTS

| | | | |
|---|---|---|---|
| 2,561,810 | 7/1951 | McCombie | 103—163 |
| 2,710,586 | 6/1955 | Shelton | 114—74 |
| 2,891,672 | 6/1959 | Veld et al. | 114—74 X |
| 3,247,864 | 4/1966 | Conery | 137—394 |
| 3,304,882 | 2/1967 | Yearout. | |

WILLIAM F. O'DEA, *Primary Examiner.*

D. R. MATTHEWS, *Assistant Examiner.*

U.S. Cl. X.R.

103—25; 214—14; 114—74; 62—50